United States Patent [19]

Froebel et al.

[11] Patent Number: 4,708,751
[45] Date of Patent: Nov. 24, 1987

[54] HALOGEN-FREE FOAM FLUXES

[75] Inventors: Gerd Froebel, Dusseldorf; Hans W. Stang, Duisburg, both of Fed. Rep. of Germany

[73] Assignee: Alpha Grillo-Lotsysteme GmbH, Duisburg-Hamborn, Fed. Rep. of Germany

[21] Appl. No.: 790,618

[22] Filed: Oct. 23, 1985

[30] Foreign Application Priority Data

Dec. 14, 1984 [DE] Fed. Rep. of Germany ....... 3445624

[51] Int. Cl.$^4$ .............................................. B23K 35/34
[52] U.S. Cl. ......................................... 148/23; 148/26
[58] Field of Search ..................................... 148/23-25

[56] References Cited

U.S. PATENT DOCUMENTS

| | | | |
|---|---|---|---|
| 4,042,731 | 8/1977 | Chay | 148/23 |
| 4,216,035 | 8/1980 | Bakos | 148/23 |
| 4,278,479 | 7/1981 | Anderson | 148/23 |
| 4,428,780 | 1/1984 | Shedroff | 148/23 |

Primary Examiner—Peter D. Rosenberg
Attorney, Agent, or Firm—Wegner & Bretschneider

[57] ABSTRACT

Halogen-free foam fluxes for mechanized soft soldering of heavy metals consisting of a solvent, an activator based on one or more dicarboxylic acids having from 4 to 12 carbon atoms, optionally rosin and/or further additives, and a foaming agent having an activator content of less than 3.5% by weight, a content of rosin and/or further conventional additives of less than 2% by weight, a content of the foaming agent of from 0.2 to 3% by weight, and a total contents of solids and foaming agent of less than 6% by weight.

6 Claims, No Drawings

HALOGEN-FREE FOAM FLUXES

The present invention relates to halogen-free foam fluxes for mechanized soft soldering of heavy metals which fluxes contain a solvent, an activator which is one or more dicarboxylic acids having from 4 to 12 carbon atoms, optionally rosin and/or further additives, and a foaming agent.

BACKGROUND OF THE INVENTION

Fluxes for the mechanical soft soldering of heavy metals have been known and are commercially available in various grades depending on the use requirements for the fluxes. The various categories are compiled in German Industry Standard DIN 8511. Fluxes for the mechanical soldering of printed circuits have to meet special requirements, more particularly so, if the printed circuits are intended for use in communication technology, data processing, and defense and space technology. More specifically, corrosion resistance demands, with or without subsequent purification, and In-Line-Circuit-Testing as increasingly applied, set new and higher standards for such fluxes.

The application of fluxes for the mechanical soft soldering of heavy metals is effected by immersing, spraying, or foaming. In immersing and spraying, the holes of perforated printed circuits are also exposed to the flux which causes considerable interference. Therefore, when applying these methods, it is necessary that first the holes are covered or otherwise protected against the action of the flux. Thus, more recently it has been preferred to use foam fluxes. The foam fluxes are foamed, for example, by blowing air thereinto through a porous stone and are applied to the printed circuits in the form of this foam. Thus, according to the state of the art foam fluxes contain a solvent, an activator which is one or more dicarboxylic acids having from 4 to 12 carbon atoms, rosin and/or further conventional additives, and a foaming agent. Fluxes and, more specifically, foam fluxes for corrosion-sensitive printed circuits as well, are preferably prepared free from halogens, since halogen-containing fluxes to a high extent tend to be susceptible to corrosion.

The halogen-free fluxes as so far known have a relatively high total solids and foaming agent contents. Most known foaming agents have concentrations of from about 10 to 30% by weight. Alone the rosin content mostly is 6% (or more) by weight. It is known that the high colophonium content acts to inhibit corrosion, since colophonium coats the metal parts with a thin water-insoluble film; however, since the heavy metal salts of the organic acids have been dissolved or suspended therein, respectively, this layer causes undesirable residual conductivity and interference to occur in high-quality printed circuits. More specifically, the rosin film adversely interferes with the In-Line-Circuit-Testing as conventionally practiced today.

In European patent application No. 83,102,353 there have been described fluxes that are free from halogen and rosin and, thus, appear to be suitable for use in high-quality printed circuits. However, a thorough investigation of these fluxes has revealed that solid coverings comprising ionizable residues are formed also, which either result in malfunctions or have to be subsequently washed off. Another disadvantage of the fluxes as described in the European patent application is that they have to be applied by spraying and cannot be used as foam fluxes.

SUMMARY OF THE INVENTION

It is the object of the present invention to provide halogen-free foam fluxes for mechanized soft soldering of heavy metals which fluxes will meet the highest standards with respect to the quality of the obtained printed circuits, can be applied simply and reliably in the form of a foam and with certainty, and do not leave any corroding residues, whereby the In-Line-Circuit-Testing can also be carried out without creating any problems.

The foregoing object, surprisingly, has been attained by the present invention which provides halogen-free foam fluxes for mechanized soft soldering of heavy metals where the fluxes contain a solvent, an activator based on one or more dicarboxylic acids having from 4 to 12 carbon atoms, optionally rosin and/or further additives, and a foaming agent, wherein
  (a) the activator content is less than 3.5% by weight;
  (b) the rosin and/or further conventional additives content is less than 2% by weight;
  (c) the foaming agent content is from 0.2 to 3% by weight; and
  (d) the total contents of solids and foaming agent is less than 6% by weight.

DETAILED DESCRIPTION OF THE INVENTION

Particularly preferred for inclusion as foaming agents in the fluxes of the present invention are non-ionic surfactants, since the foam height of ionic surfactants tends to be influenced by the pH value. Thus, particularly preferred as the foaming agents are polyglycols, high molecular weight esters, polyethers, ethoxylates, or mixtures thereof. Representative polyglycols are polyethyleneglycols and polypropyleneglycols and other polyalkyleneglycols having from about 3 to about 800 repeating alkylene units. The preferred number of repeating units is 20 to 300. A representative high molecular weight ester is sebacinic acid dihexylic ester. Representative polyethers are polyoxymethylenes, polyphenyleneoxide epoxide resins, and crown ethers. It is preferred to use polyethers with an at least moderate chain length. Ethoxylates are condensation products of ethylene oxide with alcohols, known to those skilled in the art.

It is particularly surprising that by including an amount of from 0.2 to 2% by weight of rosin (colophonium) in addition to said foaming agents, there are formed foam fluxes that exhibit all of the advantages, but none of the disadvantages, of the fluxes containing high colophonium concentrations.

The solvent for the other components in the foam flux of the present invention may be any of the conventional auxiliary agents for fluxes. Here may be mentioned propanol-2 in the first instance; however, other lower monohydric alcohols and mixtures thereof can be used as well. Thus, for example, there may be readily used mixtures containing any of propanol-2, n-propanol, and ethanol, which, moreover, may contain additional amounts of polydiols, glycol ethers, dimethyl formamide, and the like. The polydiols and glycol ethers useful as solvents for the foam flux of the present invention are low molecular weight products in liquid form. Representative examples are diethyleneglycol, triethyleneglycol, and tetraethyleneglycol. If no terminal ethoxyl group is present on the materials, they are known as glycol ethers.

The activator may be any of the conventionally used dicarboxylic acids having from 4 to 12 carbon atoms, namely alone or in the form of mixtures thereof. Mixtures of low molecular weight and high molecular weight dicarboxylic acids have proven to be particularly valuable. In practice, the dicarboxylic acids having even carbon atom numbers have proven to be most valuable, since in the range of a small number of carbon atoms the solubility thereof is distinctly lower. However, among the higher dicarboxylic acids, those having an odd number of carbon atoms are likewise usable. Rosin is known to be also a carboxylic acid, although a polycyclic one having a great number of carbon atoms. Natural colophonium more recently has also been replaced by other, in part soluble, in part insoluble resins and waxes or mixtures thereof. Thus, according to the invention there can be used not only rosin but also these conventional additives having properties similar to rosin. Particularly suitable are natural or modified natural resins as well as fully synthetic resins having a sufficient content of free carboxylic acid, which resemble rosin with respect to their thermal stabilities, their melting points, and their flow properties.

According to the present invention, the activator content is less than 3.5% by weight and preferably within the range of from 2 to 3% by weight. The rosin content must not exceed 2% by weight, since otherwise the known interference with the In-Line-Circuit-Test is to be expected. Thus, particularly preferred are rosin amounts between 0.2 and 1% by weight. According to the invention, the concentration must be between 0.2 and 3% by weight. Too low amounts do not yield a sufficient stabilization of the foam, whereas too high amounts of the foaming agent(s) result in the deposition of undesirable residues on the printed circuits.

It is of further crucial importance that the total solids and foaming agent contents is less than 6% by weight, since only with such a low total contents of solids and foaming agents undesired residue-formation and interference with the In-Line-Circuit-Test can be avoided. Surprisingly, according to the invention, it is nevertheless possible to produce halogen-free foam fluxes that enable an unobjectionable and faultless soldering to be performed while they do not cause any corrosion to occur and do not leave any undesired residue on the printed circuit. More specifically, due to the addition of rosin, apparently the metal salts of the higher dicarboxylic acids are also dissolved in the rosin to a sufficient extent, so that the metal salts will not precipitate from the flux and will not have to be removed from the flux by using sieves or other measures. On the other hand, the small rosin amounts are insufficient to leave a film on the printed circuit, which film would interfere with the In-Line-Circuit-Testing. The low amount of flux apparently is completely absorbed by the solder and removed.

The present invention is further illustrated by the following non-limiting examples, which show some typical compositions of the foam fluxes according to the invention.

EXAMPLE 1

| | |
|---|---|
| Adipic acid | 1.5% by weight |
| Sebacic acid | 0.5% by weight |
| Polyethyleneglycol monolaurate | 1.2% by weight |
| Rosin | 0.8% by weight |
| Total contents of solids and foaming agent | 4.0% by weight |
| Propanol-2 | 50.0% by weight |
| Ethanol | 46.0% by weight |

This composition, when used as a foam flux, exhibited excellent properties as a flux without yielding residues and corrosion and without error signals in the In-Line-Circuit-Test.

EXAMPLE 2

| | |
|---|---|
| Succinic acid | 1.6% by weight |
| Sebacic acid | 0.6% by weight |
| Polyethoxyalkanol | 1.5% by weight |
| Rosin | 1.0% by weight |
| Total contents of solids and foaming agent | 5.7% by weight |
| Propanol-2 | 45.0% by weight |
| Ethanol | 44.3% by weight |
| Ethoxyethanol | 5.0% by weight |

This composition also exhibited excellent properties when used as a foam flux.

EXAMPLE 3

| | |
|---|---|
| Adipic acid | 1.2% by weight |
| Suberic acid | 0.8% by weight |
| Hexylene glycol | 1.6% by weight |
| Rosin | 0.4% by weight |
| Total contents of solids and foaming agent | 4.0% by weight |
| Propanol-2 | 80.0% by weight |
| n-Propanol | 16.0% by weight |

This composition also exhibited excellent properties as a foam flux.

EXAMPLE 4

| | |
|---|---|
| Adipic acid | 1.0% by weight |
| Suberic acid | 1.0% by weight |
| Polyethylene glycol 200 | 1.3% by weight |
| Rosin | 0.7% by weight |
| Total contents of solids and foaming agent | 4.0% by weight |
| Propanol-2 | 75.0% by weight |
| n-Propanol | 16.0% by weight |
| 2-(2-n-Butoxyethoxy)ethanol | 5.0% by weight |

This composition also exhibited excellent properties as a foam flux.

EXAMPLE 5

| | |
|---|---|
| Adipic acid | 1.6% by weight |
| Sebacic acid | 0.4% by weight |
| Polyethoxyalkanol | 1.5% by weight |
| Polywax 2000 (a polyethyleneoxide wax) | 0.5% by weight |
| Total contents of solids and foaming agent | 4.0% by weight |
| Propanol-2 | 75.0% by weight |
| Ethoxyethanol | 7.5% by weight |
| Ethanol | 13.5% by weight |

This composition also has good properties when used as a foam flux with respect to foam formation and soldering ability as well as an absence of residue formation, while, however, contrary to the preceding Examples, it is completely water-soluble.

EXAMPLE 6

| | |
|---|---|
| Citric acid | 2.0% by weight |
| Fumaric acid | 0.5% by weight |
| Polyethyleneglycol monolaurate | 1.0% by weight |
| Oxide wax A (a polyoxyalkylene wax) | 1.5% by weight |
| Total contents of solids and foaming agent | 5.0% by weight |
| n-Propanol | 40.0% by weight |
| Ethyleneglycol | 15.0% by weight |
| 2-Butoxyethanol | 10.0% by weight |
| Propanol-2 | 30.0% by weight |

This composition having excellent properties as a foam flux is also completely water-soluble.

What is claimed is:

1. A halogen-free foam flux for the mechanized soft soldering of heavy metals comprising
    a solvent,
    at least one dicarboxylic acid activator having from 4 to 12 carbon atoms, and
    a foaming agent, wherein
        (a) said foam flux is halogen-free;
        (b) said activator is present in an amount less than 3.5% by weight;
        (c) said foaming agent is present in an amount of from 0.2 to 3% by weight; and
        (d) the total solids and foaming agent content is less than 6% by weight.

2. The foam flux of claim 1, wherein said foaming agent is a non-ionic surfactant.

3. The foam flux of claim 1, wherein said foaming agent is a polyglycol, a high molecular weight ester, a polyether, an ethoxylate or mixtures thereof.

4. The foam flux of claim 1 further comprising rosin present in a quantity of less than 2% by weight.

5. The foam flux of claim 2, wherein said foaming agent is a polyglycol, a high molecular weight ester, a polyether, an ethoxylate, or mixtures thereof.

6. The foam flux of claim 4, wherein said rosin content is from 0.2 to 2% by weight.

* * * * *